July 28, 1925.

M. LEUCHT 1,547,424

CAKE PAN

Filed Dec. 4, 1922

Inventor
Mella Leucht
By Williams, Bradbury, McCaleb & Hinkle
Attys

Patented July 28, 1925.

1,547,424

UNITED STATES PATENT OFFICE.

MELLA LEUCHT, OF TERRE HAUTE, INDIANA.

CAKE PAN.

Application filed December 4, 1922. Serial No. 604,652.

*To all whom it may concern:*

Be it known that I, MELLA LEUCHT, a citizen of the United States of America, and a resident of Terre Haute, in the county of Vigo and the State of Indiana, have invented a new and useful Improvement in a Cake Pan, of which the following is a specification.

My invention relates to a device for baking cakes, especially cakes of a light and spongy character, such as is commonly known as angel food cake.

The main objects of my invention are: to provide a receptacle which is not separable; to provide a receptacle which is easy to fill; to provide a receptacle which gives an even distribution of temperature; to provide a receptacle that can be easily inverted for the purpose of having gravity tend to prevent shrinkage in volume during the cooling process; to provide a receptacle from which the cake can be easily removed.

With these main objects in view my invention comprises a receptacle having a circular base, a side wall perpendicular to the base, a cylinder perpendicular to the base at its center with two or more openings in the side wall covered by sliding shutters, which when open give access to the inner bottom of the pan and when closed form a substantially dough tight joint.

My invention may be best understood by having reference to the drawing which accompanies and forms part of this specification and which illustrates the embodiments of my invention. In this drawing,—

The same reference characters indicate the same parts in all views.

Figure 1:
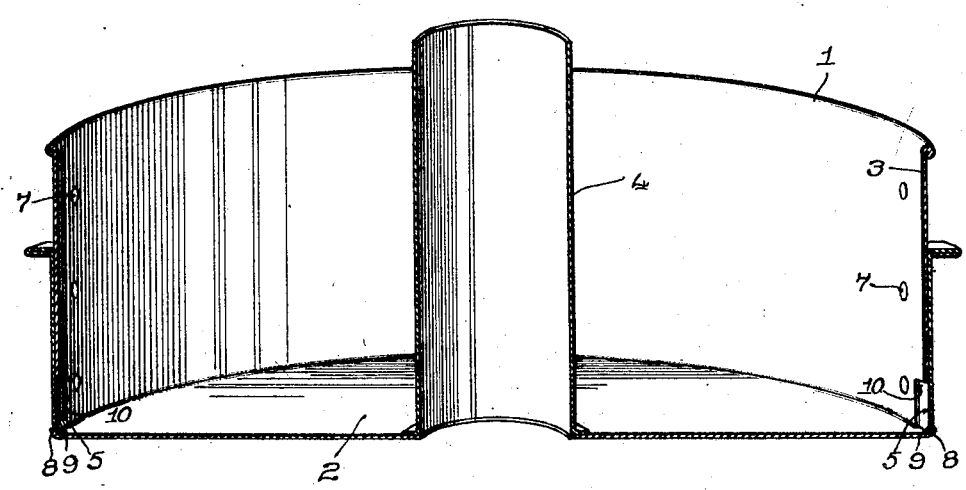
Figure 1 is a vertical section taken through the receptacle and showing the same in its filling and baking positions.

In the drawing, numeral 1 designates a sheet metal receptacle comprising the base or pan bottom 2, the side wall 3 and the central cylinder 4. Movable on the outer surface of the side wall 3 and preferably located diametrically opposite each other are slides or shutters 5—5, each of these slides or shutters being adapted for vertical rectilinear movement by guides or ways 6—6, which are illustrated as being held on the side wall by rivets 7—7.

It will be noted that each of the slides or shutters 5—5 may be moved to cover or uncover a horizontally elongated slot 10 which is formed in the lower portion of the side wall, the lower edges or margins of these slots being located at the level of the upper surface of the pan bottom. Attention is directed to the fact that the metal of the pan bottom is conformed at the slots to provide up-turned peripheral portions 8, which, when the slides are in position to close the slots 10, engage the lower edges 9 of the slides and also engage the lower portions of the outer surfaces of the slides. This construction very effectively prevents leakage past the lower edges of the slides or shutters, leakage past the other edges of the slides or shutters effectively being prevented by substantial surface contact between the inner faces of the slides or shutters and the outer surfaces of the wall 3 as well as by contact between the slides or shutters and the guides or ways 6—6.

In the process of producing a cake, there are four operations involving the use of the receptacle; firstly, filling; secondly, baking; thirdly, cooling; fourthly, the separation of the cake from the receptacle.

Figure 2:
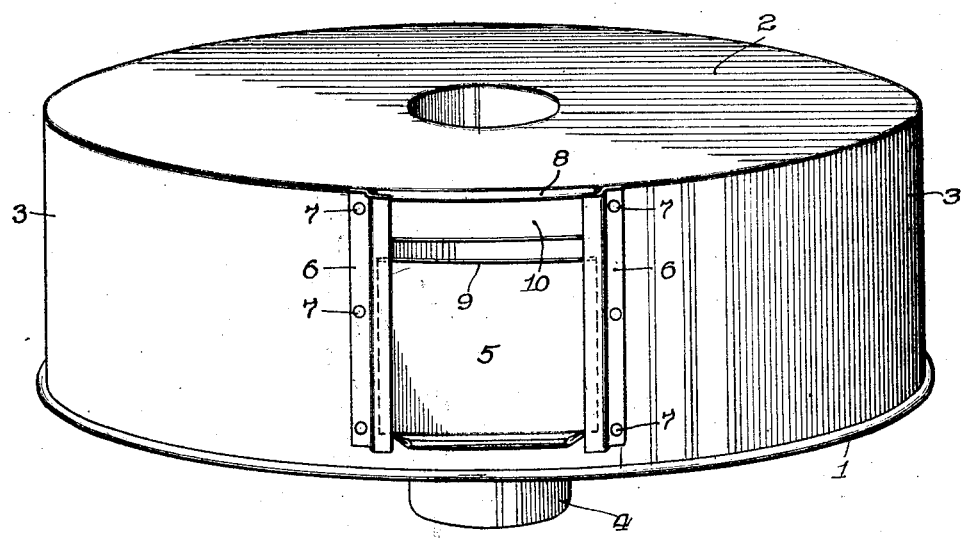
Figure 2 is an elevation of the receptacle in its inverted position, and showing the same in its cooling and removal positions.

To prepare the receptacle 1 for filling, the lower edge 9 of each shutter 5 is moved down to abut against and lie within the adjacent up-turned peripheral portion 8 of the pan bottom. During baking the shutters remain closed. When the cake is to be cooled, the receptacle 1 is removed from the oven, inverted and made to stand on the central cylinder 4, as shown in Figure 2. In removing the cake from the receptacle, it may be maintained in its inverted position and the shutters 5—5 pressed downwardly to expose the slots 10—10 in the side wall 3, allowing air to enter between the bottom of the cake and the pan bottom and thereby removing atmospheric pressure as a factor in holding the cake in the inverted receptacle. A thin knife blade may be inserted through the slots 10—10 to facilitate the separation of the bottom of the cake from the pan bottom or base 2.

I do not wish to be limited to the particular embodiment of my invention which I may have disclosed herein inasmuch as there are modifications that may be made therein by those skilled in the art without departing from the spirit of my invention.

Having thus described my invention, what I claim is,—

1. In a sheet metal cake pan of the class described, a side wall and bottom at right angles to each other, said side wall being provided with horizontally elongated slots having their lower edges at the level of the upper surface of the pan bottom, slides mounted on the outer surface of said side wall capable of rectilinear movement on the side wall to cover and uncover said slots, the bottom of said pan being turned outwardly and upwardly at said slots to engage both the lower edges of said slides and the outer surfaces of the lower portions thereof when the slides are in position to cover said slots.

2. In a sheet metal cake pan of the class described, a side wall and a bottom at right angles to each other, said side wall being provided with horizontally elongated slots having their lower edges at the level of the upper surface of the pan bottom, slides mounted on the outer surface of said side wall capable of vertical movement thereon to cover and uncover said slots, a flange formed as a part of the bottom of said pan, the said flange being gradually curved upwardly at said slots to engage both the lower edges of said slides and the outer surfaces of the lower portions thereof when the slides are moved downwardly in position to cover said slots.

3. In a sheet metal cake pan, a side wall and bottom at right angles to each other, a continuous outwardly and upwardly turned flange formed as a part of the bottom of said pan for attachment to the side wall thereof, the said side wall being provided with an elongated slot having its lower edge at the level of the pan bottom, a slide mounted on the outer surface of said side wall capable of rectilinear movement thereon to cover and uncover said slot, the lower edge of said slide being turned inwardly for cooperation with said outwardly turned flange of the pan bottom to thereby force the slide against said side wall of the pan when said slide is in position to cover the slot.

In testimony whereof I affix my signature, in the presence of two witnesses.

MELLA LEUCHT.

Witnesses:
FRANK R. MILLER,
CARL N. MILLER.